(12) United States Patent
Galsworthy et al.

(10) Patent No.: US 11,285,807 B2
(45) Date of Patent: Mar. 29, 2022

(54) DRIVELINE ASSEMBLY FOR A UTILITY VEHICLE

(71) Applicant: Polaris Industries Inc., Medina, MN (US)

(72) Inventors: David A. Galsworthy, Wyoming, MN (US); Adrien O. Lechat, Blaine, MN (US); Gary A. Pinkley, Lino Lakes, MN (US); Aaron D. Deckard, Zionsville, IN (US)

(73) Assignee: Polaris Industries Inc., Medina, MN (US)

( * ) Notice: Subject to any disclaimer, the term of this patent is extended or adjusted under 35 U.S.C. 154(b) by 394 days.

(21) Appl. No.: 16/238,991

(22) Filed: Jan. 3, 2019

(65) Prior Publication Data

US 2019/0210457 A1 Jul. 11, 2019

Related U.S. Application Data

(60) Provisional application No. 62/613,796, filed on Jan. 5, 2018.

(51) Int. Cl.
*B60K 17/344* (2006.01)
*B60K 17/34* (2006.01)
(Continued)

(52) U.S. Cl.
CPC .............. *B60K 17/344* (2013.01); *B60G 3/20* (2013.01); *B60K 5/00* (2013.01); *B60K 5/02* (2013.01); *B60K 17/08* (2013.01); *B60K 17/22* (2013.01); *B60K 17/34* (2013.01); *B60G 2300/07* (2013.01); *B60K 2005/003* (2013.01)

(58) Field of Classification Search
CPC ........ B60K 17/344; B60K 17/34; B60K 5/00; B60K 5/02; B60K 17/08; B60K 17/22; B60K 2005/003; B60G 3/20; B60G 2300/07

See application file for complete search history.

(56) References Cited

U.S. PATENT DOCUMENTS

| 308 A | * | 7/1837 | Winans | B60K 6/12 60/668 |
|---|---|---|---|---|
| 3,227,488 A | | 1/1966 | Kosbab | |

(Continued)

FOREIGN PATENT DOCUMENTS

| DE | 10252155 | 5/2004 |
|---|---|---|
| DE | 102006061816 | 6/2008 |

(Continued)

OTHER PUBLICATIONS

International Search Report issued by the European Patent Office, dated Jul. 5, 2019, for International Patent Application No. PCT/US2019/012868; 6 pages.

(Continued)

*Primary Examiner* — Minnah L Seoh
*Assistant Examiner* — Harold Eric Pahlck, III
(74) *Attorney, Agent, or Firm* — Faegre Drinker Biddle & Reath LLP

(57) ABSTRACT

A driveline assembly for a utility vehicle includes an engine, an automated sequential transmission positioned forward of the engine, and a gearbox operably coupled to the automated sequential transmission.

21 Claims, 10 Drawing Sheets

(51) Int. Cl.
  *B60K 5/00*    (2006.01)
  *B60G 3/20*    (2006.01)
  *B60K 5/02*    (2006.01)
  *B60K 17/08*   (2006.01)
  *B60K 17/22*   (2006.01)

(56) References Cited

U.S. PATENT DOCUMENTS

| | | | | |
|---|---|---|---|---|
| 3,709,314 | A | * | 1/1973 | Hickey ............... B60G 17/02 180/249 |
| 3,804,055 | A | * | 4/1974 | Nishikawa ............ B60K 37/00 116/28.1 |
| 3,901,092 | A | * | 8/1975 | Romick ............ B60K 17/3465 475/249 |
| 4,373,604 | A | * | 2/1983 | Lunn ................. B60K 17/34 180/247 |
| 4,381,828 | A | * | 5/1983 | Lunn ................. B60K 17/34 180/247 |
| 4,632,207 | A | * | 12/1986 | Moore ............. B60K 17/3465 180/247 |
| 4,699,418 | A | | 10/1987 | Plavetich |
| 4,932,709 | A | | 6/1990 | Wainwright |
| 5,176,398 | A | | 1/1993 | Kanai |
| 6,000,296 | A | * | 12/1999 | Sundquist ............ B60K 20/04 180/233 |
| 6,386,629 | B1 | | 5/2002 | Severinski |
| 7,192,088 | B1 | | 3/2007 | Trombley |
| 7,748,766 | B2 | | 7/2010 | Villeminey |
| 8,109,308 | B2 | | 2/2012 | Manesh |
| 8,176,957 | B2 | | 5/2012 | Manesh |
| 8,328,235 | B2 | | 12/2012 | Schneider |
| 8,678,464 | B2 | | 3/2014 | Smith |
| 8,764,039 | B2 | | 7/2014 | Keller |
| 8,944,449 | B2 | | 2/2015 | Hurd |
| 9,108,470 | B2 | | 9/2015 | Tercha |
| 9,393,894 | B2 | | 7/2016 | Steinmetz |
| 9,566,858 | B2 | | 2/2017 | Hicke |
| 9,776,481 | B2 | | 10/2017 | Deckard |
| 9,908,445 | B2 | | 3/2018 | Park |
| 9,981,519 | B2 | | 5/2018 | Despres-Nadeau |
| 10,604,038 | B2 | | 3/2020 | Li |
| 2002/0040822 | A1 | * | 4/2002 | Gagnon ............... B60K 17/06 180/248 |
| 2003/0085062 | A1 | * | 5/2003 | Bowen .................. B60K 6/48 180/65.1 |
| 2004/0195797 | A1 | * | 10/2004 | Nash ............... B62D 21/183 280/124.136 |
| 2005/0113203 | A1 | * | 5/2005 | Mueller .............. B60K 23/08 475/223 |
| 2006/0283654 | A1 | * | 12/2006 | Krisher ............... B60K 17/20 180/354 |
| 2006/0289217 | A1 | * | 12/2006 | Schlaf ................ B60K 23/08 180/247 |
| 2007/0157899 | A1 | * | 7/2007 | Seufert ................ B60W 10/06 123/179.25 |
| 2009/0072572 | A1 | | 3/2009 | Scheinberg |
| 2009/0195037 | A1 | | 8/2009 | Plavetich |
| 2009/0243325 | A1 | | 10/2009 | Villeminey |
| 2011/0133533 | A1 | | 6/2011 | Herzberg |
| 2012/0031688 | A1 | * | 2/2012 | Safranski ........... B60K 17/348 180/54.1 |
| 2013/0105238 | A1 | * | 5/2013 | Hall .................... B62J 35/00 180/210 |
| 2013/0213157 | A1 | * | 8/2013 | Martin ............... B60K 17/344 74/15.82 |
| 2013/0240272 | A1 | | 9/2013 | Gass |
| 2013/0277937 | A1 | | 10/2013 | Keller |
| 2013/0337951 | A1 | * | 12/2013 | Hasewend ............ F16D 23/06 474/86 |
| 2014/0025246 | A1 | * | 1/2014 | Hall ..................... B62M 9/04 701/22 |
| 2014/0077536 | A1 | | 3/2014 | Mather |
| 2014/0103627 | A1 | | 4/2014 | Deckard |
| 2014/0124279 | A1 | * | 5/2014 | Schlangen .......... B60G 13/003 180/68.4 |
| 2014/0345964 | A1 | * | 11/2014 | Nakaoka ................ B60K 5/04 180/291 |
| 2015/0061275 | A1 | | 3/2015 | Deckard |
| 2015/0274171 | A1 | * | 10/2015 | Makabe ................ F16H 63/18 701/53 |
| 2016/0305531 | A1 | * | 10/2016 | Martin ............... B60K 17/344 |
| 2016/0347137 | A1 | | 12/2016 | Despres-Nadeau |
| 2017/0008438 | A1 | | 1/2017 | Clark |
| 2017/0057351 | A1 | * | 3/2017 | Bandy .................. B60K 5/02 |
| 2017/0075476 | A1 | * | 3/2017 | Kwon ................. G06F 3/04883 |
| 2017/0080977 | A1 | | 3/2017 | Schroeder |
| 2017/0136874 | A1 | | 5/2017 | Harris |
| 2017/0166255 | A1 | | 6/2017 | Peterson |
| 2017/0225563 | A1 | * | 8/2017 | Hwang ................ B60K 25/06 |
| 2018/0147902 | A1 | | 5/2018 | Hu |
| 2018/0264902 | A1 | | 9/2018 | Schroeder |
| 2018/0281861 | A1 | * | 10/2018 | Gordon ............... B60K 17/306 |
| 2019/0093745 | A1 | | 3/2019 | Younggren |
| 2019/0193501 | A1 | | 6/2019 | Brady |
| 2019/0210484 | A1 | | 7/2019 | Deckard |

FOREIGN PATENT DOCUMENTS

| | | |
|---|---|---|
| DE | 102007048700 | 4/2009 |
| DE | 102008029261 | 12/2009 |
| DE | 102015222761 | 5/2017 |
| FR | 2443964 | 7/1980 |
| FR | 2886593 | 12/2006 |
| FR | 2889122 | 2/2007 |
| GB | 2388313 | 11/2003 |
| JP | 62-134130 | 6/1987 |
| JP | 62-134310 | 6/1987 |
| JP | 63-101112 | 5/1988 |
| JP | 63134310 | 6/1988 |
| JP | 2003-080982 | 3/2003 |

OTHER PUBLICATIONS

Written Opinion issued by the European Patent Office, dated Jul. 5, 2019, for International Patent Application No. PCT/US2019/012868; 11 pages.

Invitation to Pay Additional Fees and Annex to Form PCT/ISA/206 issued by the European Patent Office, mailed Apr. 4, 2019, for International Patent Application No. PCT/US2018/066774; 16 pages.

International Search Report and Written Opinion issued by the European Patent Office, dated Mar. 26, 2019, for International Patent Application No. PCT/US2019/012276; 9 pages.

International Search Report and Written Opinion issued by the European Patent Office, dated May 27, 2019, for International Patent Application No. PCT/US2018/066774; 19 pages.

International Preliminary Report on Patentability issued by The International Bureau of WIPO, dated Jul. 7, 2020, for International Patent Application No. PCT/US2019/012276; 7 pages.

Office Action issued by the Canadian Intellectual Property Office, dated Jul. 30, 2021, for Canadian Patent Application No. 3,088,883; 3 pages.

* cited by examiner

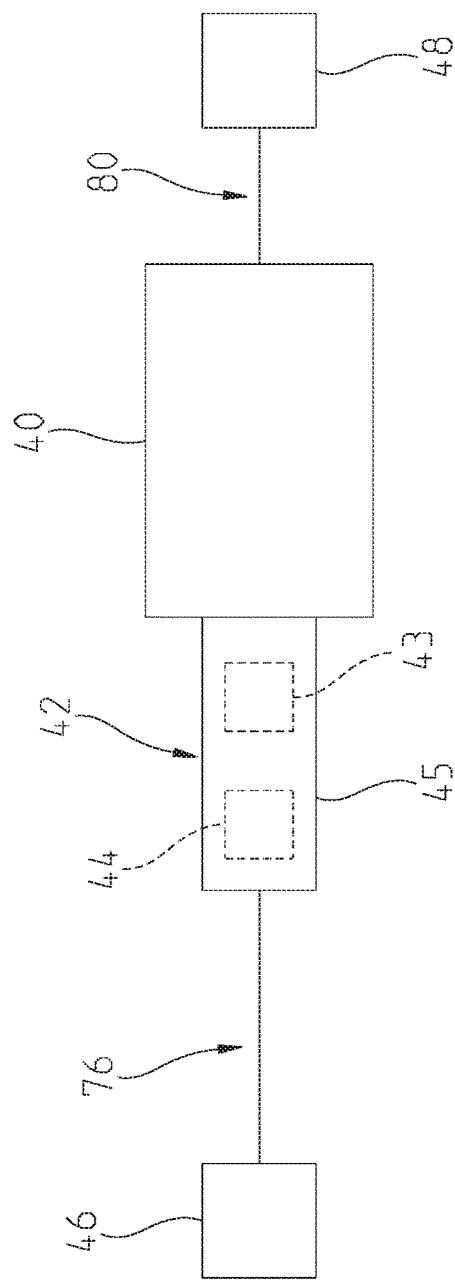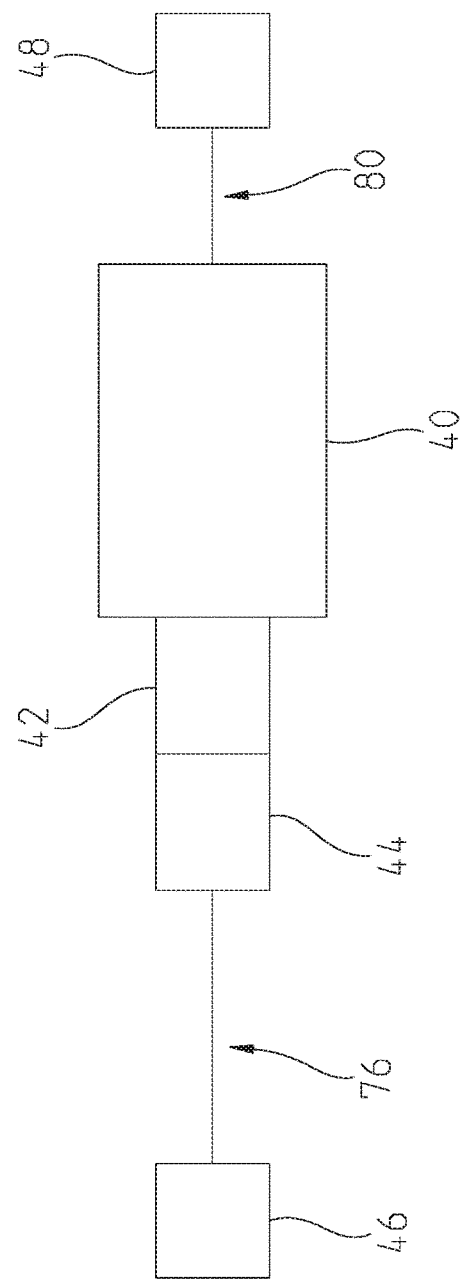

DRIVELINE ASSEMBLY FOR A UTILITY VEHICLE

CROSS-REFERENCE TO RELATED APPLICATIONS

The present application claims priority to U.S. Provisional Patent Application Ser. No. 62/613,796, filed on Jan. 5, 2018, the complete disclosure of which is expressly incorporated by reference herein. The present application also is related to U.S. Provisional Patent Application Ser. No. 62/608,952, filed on Dec. 21, 2017, and U.S. Provisional Patent Application Ser. No. 62/615,142 filed on Jan. 9, 2018, the complete disclosures of which are expressly incorporated by reference herein.

FIELD OF THE DISCLOSURE

The present application relates to a utility vehicle and, more particularly, a driveline assembly for a utility vehicle which includes an automated sequential transmission.

BACKGROUND OF THE DISCLOSURE

Various driveline embodiments for a vehicle may include an engine and a transmission operably coupled to the front and/or rear wheels to provide motive power to drive the vehicle. The engine may have a plurality of cylinders and is configured to provide a maximum horsepower based on the parameters and specifications of the vehicle. The engine is operably coupled to the transmission, which may be an automated or manual transmission. In one embodiment, the transmission may be an automated sequential transmission ("AST") which is configured as a manual transmission that shifts between or changes gears through sensors, pneumatics, and/or actuators rather than a clutch pedal.

Space constraints on a vehicle, especially an off-road vehicle which may have maximum width and length requirements for trail compatibility, may make it difficult to package the driveline components on the vehicle in a manner that does not interfere with other vehicle components. As such, there is a need to provide a compact driveline arrangement with an engine and an AST on an off-road vehicle.

SUMMARY OF THE DISCLOSURE

In one embodiment of the present disclosure, a driveline assembly for a utility vehicle comprises an engine, an automated sequential transmission positioned forward of the engine, and a gearbox operably coupled to the automated sequential transmission.

In another embodiment of the present disclosure, a utility vehicle comprises a plurality of ground-engaging members, a frame assembly supported by the plurality of ground-engaging members, and an operator area supported by the frame assembly. The operator area includes seating with a first seating portion for an operator and a second seating portion for a passenger. The utility vehicle further comprises a driveline assembly operably coupled to the plurality of ground-engaging members. The driveline assembly comprises an engine positioned rearward of the operator area, an automated sequential transmission operably coupled to the engine and positioned at least partially rearward of the operator area, and a gearbox operably coupled to the automated sequential transmission and positioned rearward of at least a portion of the seating.

In a further embodiment of the present disclosure, a utility vehicle comprises at least one front ground-engaging member, at least one rear ground-engaging member, a frame assembly supported by the at least one front ground-engaging member and the at least one rear ground-engaging member, and an operator area supported by the frame assembly and including seating with a first seating portion for an operator and a second seating portion for a passenger. The utility vehicle further comprises a rear suspension assembly operably coupled to the at least one rear ground-engaging member and including trailing arms operably coupled to the at least one rear ground-engaging member and the frame, a shock absorber operably coupled to each of the trailing arm, at least one radius rod operably coupled to the at least one rear ground-engaging member. The utility vehicle also comprises a driveline assembly operably coupled to the at least one front ground-engaging member and the at least one rear ground-engaging member. The driveline assembly comprises an engine positioned rearward of the operator area and positioned within a longitudinal envelope defined by the trailing arms. The driveline assembly also comprises an automated sequential transmission operably coupled to the engine and positioned at least partially rearward of the operator area. The automated sequential transmission is positioned at least partially within the longitudinal envelope defined by the trailing arms. The driveline assembly further comprises a gearbox operably coupled to the automated sequential transmission and positioned rearward of at least a portion of the seating.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, where:

FIG. 2A is a schematic view of a driveline assembly of the utility vehicle of FIG. 1 with a first embodiment of a transmission;

FIG. 2B is a schematic view of the driveline assembly of FIG. 2A with a second embodiment of the transmission;

Figure 1:
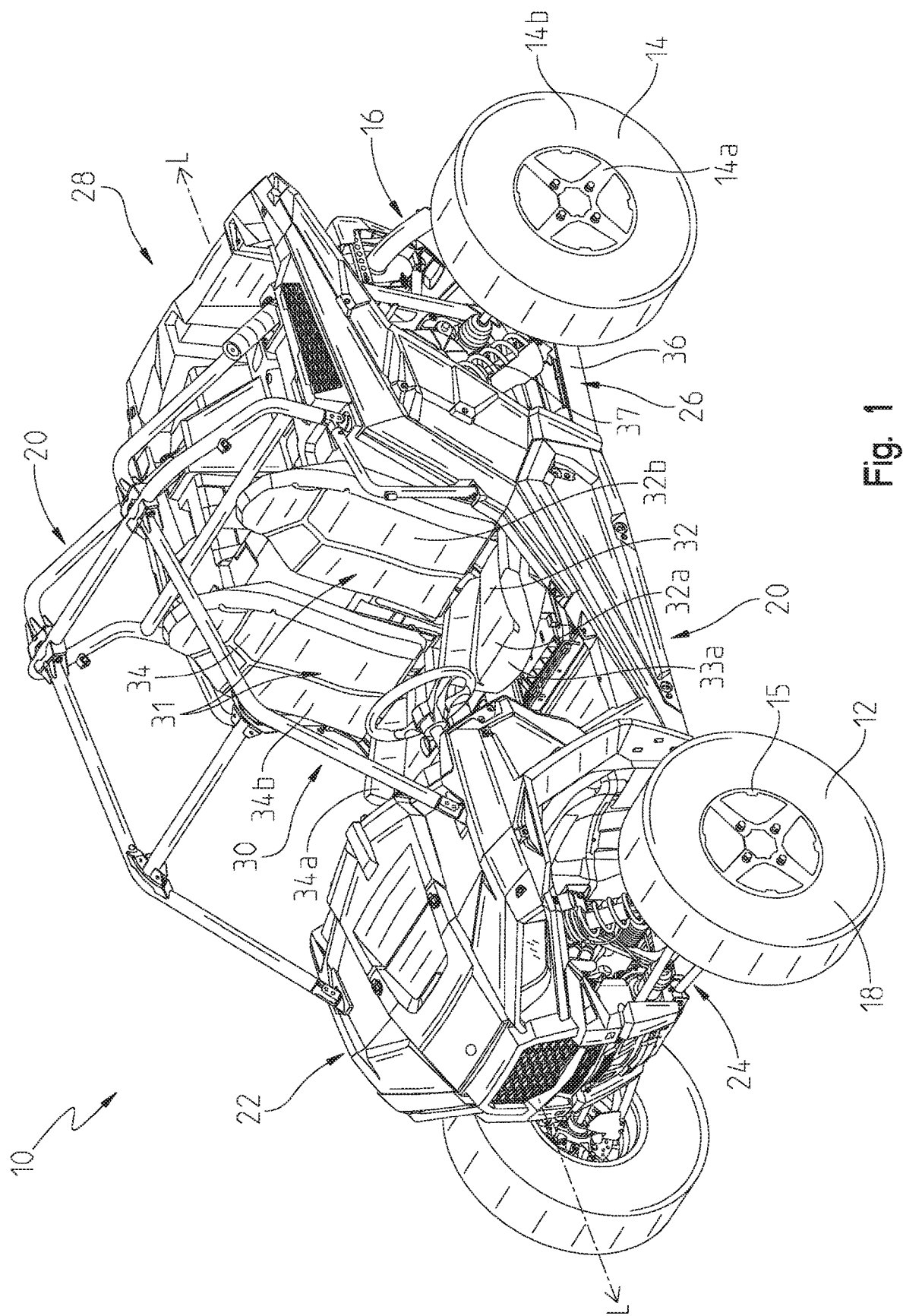
FIG. 1 is a front left perspective view of a utility vehicle of the present disclosure.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as other all-terrain vehicles, motorcycles, snowmobiles, and golf carts.

Referring to FIG. 1, an illustrative embodiment of a utility vehicle 10 is shown which is configured to traverse a variety of terrains, including mud, rocks, dirt, and other trail or off-road conditions. Vehicle 10 may be referred to as a utility vehicle ("UV"), an all-terrain vehicle ("ATV"), or a side-by-side vehicle ("SxS") and is configured for travel over various terrains or surfaces. More particularly, vehicle 10 may be configured for military, industrial, agricultural, or recreational applications.

Vehicle 10 includes a plurality of ground-engaging members, including front ground-engaging members 12 and rear-ground engaging members 14, a powertrain or driveline assembly 16, a frame assembly 20, a plurality of body panels 22 coupled to frame assembly 20, a front suspension assembly 24 supported by a front portion of frame assembly 20, a rear suspension assembly 26 supported by a rear frame portion 20b of frame assembly 20, and a rear cargo area 28 supported by rear frame portion 20b of frame assembly 20. As shown in FIG. 1, vehicle 10 extends between front and rear ground-engaging members 12, 14 in a longitudinal direction along a longitudinal vehicle centerline L. More particularly, and as shown best in FIG. 6, frame assembly 20 includes a front frame portion 20a generally supported by front ground-engaging members 12 on a ground surface G (FIG. 8) and rear frame portion 20b generally supported by rear ground-engaging members 14 on ground surface G, and frame assembly 20 extends longitudinally between front and rear frame portions 20a, 20b along centerline L.

As shown in FIG. 1, front ground-engaging members 12 may include a wheel assembly 15 and a tire 18 extending radially about wheel assembly 15. Similarly, rear ground-engaging members 14 may include a wheel assembly 14a and a tire 14b extending radially about wheel assembly 14a. In one embodiment, one or more ground-engaging members 12, 14 may be replaced with tracks, such as the PROSPECTOR II tracks available from Polaris Industries, Inc. located at 2100 Highway 55 in Medina, Minn. 55340, or non-pneumatic tires as disclosed in any of U.S. Pat. No. 8,109,308, filed on Mar. 26, 2008; U.S. Pat. No. 8,176,957, filed on Jul. 20, 2009; and U.S. Pat. No. 9,108,470, filed on Nov. 17, 2010; and U.S. Patent Application Publication No. 2013/0240272, filed on Mar. 13, 2013, the complete disclosures of which are expressly incorporated by reference herein.

Figure 6:
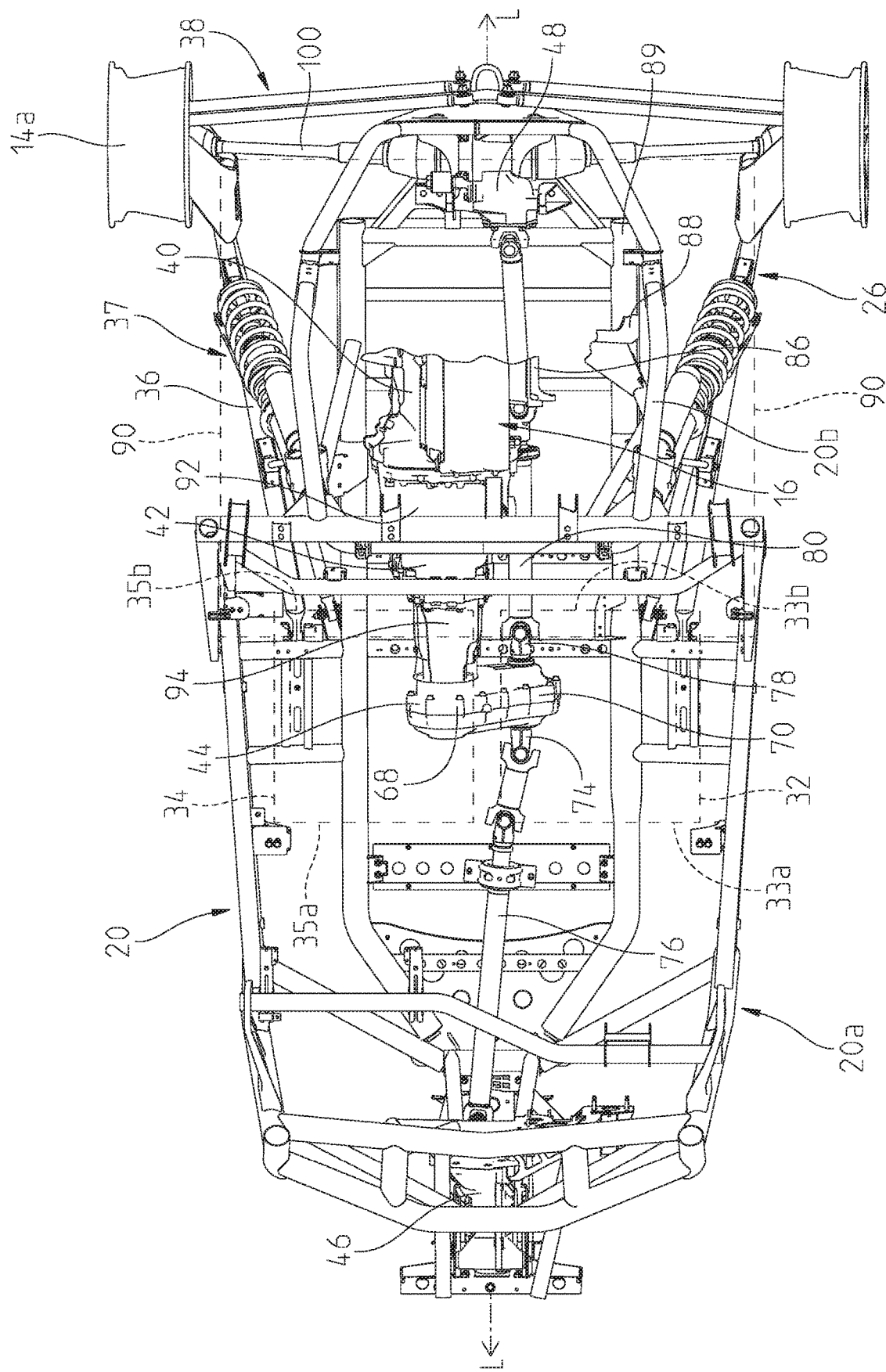
FIG. 6 is a top view of the driveline assembly of FIG. 3 supported on a frame assembly of the utility vehicle of FIG. 1 and positioned relative to a rear suspension assembly of the utility vehicle of FIG. 1.

Referring still to FIG. 1, vehicle 10 includes an operator area 30 supported by frame assembly 20 and which includes seating 31 for at least an operator. One embodiment of vehicle 10 includes a first seating portion, illustratively an operator seat 32, and a second seating portion, illustratively a front passenger seat 34. More particularly, operator seat 32 and front passenger seat 34 are in a side-by-side arrangement, however, operator seat 32 and passenger seat 34 may be in a longitudinal arrangement or in any configuration of seats positioned adjacent each other or longitudinally spaced apart from each other. In one embodiment, vehicle 10 may include multiple passenger seats 34 positioned rearward of operator seat 32. Operator seat 32 includes a seat bottom 32a, illustratively a bucket seat, and a seat back 32b. Seat 32 has a forward-most extent 33a and a rearward-most extent 33b (FIG. 6). Similarly, front passenger seat 34 includes a seat bottom 34a, illustratively a bucket seat, and a seat back 34b. Seat 34 has a forward-most extent 35a and a rearward-most extent 35b (FIG. 6). Additional details of vehicle 10 may be disclosed in U.S. patent application Ser. No. 14/051,700, filed Oct. 11, 2013; U.S. patent application Ser. No. 14/477,589, filed Sep. 4, 2014; and U.S. patent application Ser. No. 14/577,908, filed Dec. 19, 2014; the complete disclosures of which are expressly incorporated by reference herein.

Referring to FIGS. 1 and 6, rear suspension assembly 26 is positioned rearward of operator area 30 and includes trailing arms 36 operably coupled to rear frame portion 20b and rear ground-engaging members 14, shock absorbers 37 operably coupled to rear frame portion 20b and trailing arms 36, and control arms or radius rods 38 operably coupled to rear frame portion 20b and rear ground-engaging members 14. Rear suspension assembly 26 also may include a torsion or sway bar (not shown) operably coupled to trailing arms 36. Additional details of rear suspension assembly 26 may be disclosed in U.S. Patent Application Ser. No. 62/608,952, filed on Dec. 21, 2017, and entitled "REAR SUSPENSION ASSEMBLY FOR A VEHICLE", the complete disclosure of which is expressly incorporated by reference herein.

Referring to FIGS. 2A and 2B, driveline assembly 16 is disclosed. Driveline assembly 16 includes at least an engine 40, a transmission 42, a gearbox 44, a front final drive member 46, and a rear final drive member 48. Illustrative driveline assembly 16 is configured with engine 40 supported on rear frame portion 20b (FIG. 6), transmission 42 positioned longitudinally forward of engine 40, and gearbox 44 positioned longitudinally forward of transmission 42. As disclosed further herein, engine 40 is positioned longitudinally rearward of operator area 30 and, more particularly, is positioned longitudinally rearward of rearward-most extent 33b, 35b of seating 31. Transmission 42 may extend forwardly from engine 40 and may extend into a portion of operator area 30. Gearbox 44 also may be positioned within a portion of operator area 30.

Engine 40 may be an internal combustion engine or any other type of engine or motor configured to provide motive power for vehicle 10. Illustratively, engine 40 includes a crankcase or outer housing 50 configured to support at least a crankshaft (not shown) therein. Engine 40 also includes cylinders 52 coupled to crankcase 50 and extending upwardly therefrom. Cylinders 52 are coupled to cylinder heads 54. In one embodiment, cylinder 52 and cylinder heads 54 may be angled relative to a vertical axis (not shown) which perpendicularly intersects centerline L (FIG. 6). However, in other embodiments, cylinder 52 and cylinder heads 54 are aligned with the vertical axis. Engine 40 may be configured to operate with any type of fuel, such as gasoline, diesel, natural gas, etc. Additionally, engine 40 may have any number of cylinders 52.

Engine 40 may be supported on rear frame portion 20b with engine mount assembly 86, as shown best in FIGS. 3-7. Engine mount assembly 86 may be removably coupled to crankcase 50 with mechanical fasteners or may be integrally formed with a portion of crankcase 50. Illustratively, and as shown best in FIGS. 6 and 7, engine mount assemblies 86 are configured to couple with frame arms 88 of rear frame portion 20b. Each of frame arms 88 are coupled to a longitudinally-extending frame member 89 of rear frame portion 20b and extend upwardly therefrom to couple with engine mount assembly 86. One or more of frame arms 88 may be angled relative to vertical in order to position engine 40 at a desired location on rear frame portion 20b.

Figure 5:
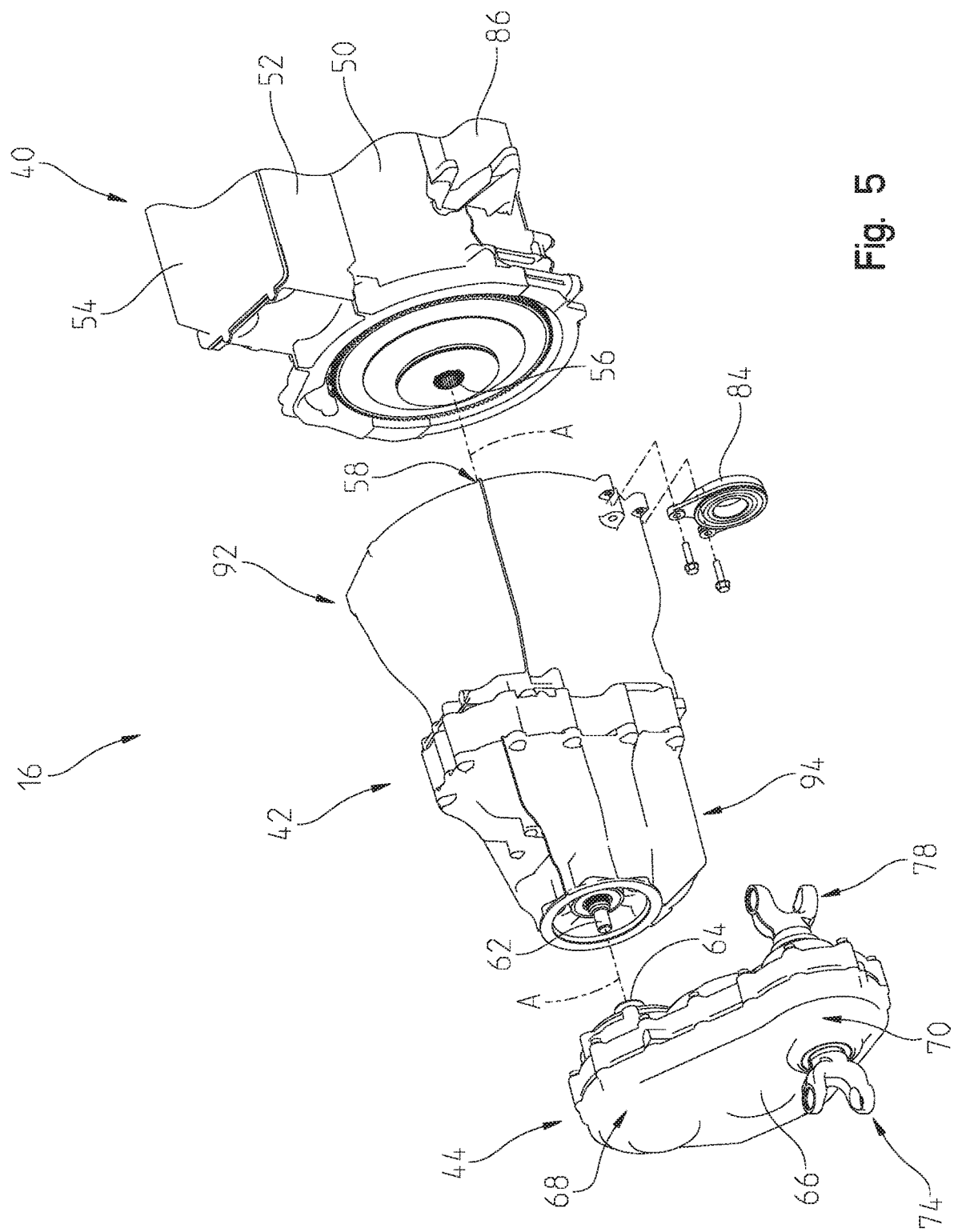
FIG. 5 is an exploded view of the engine, automated sequential transmission, and gearbox of the driveline assembly of FIG. 4A.

As shown in at least FIG. 5, engine 40 is configured with an output 56 which operably or drivingly couples engine 40 to transmission 42. More particularly, output 56 may be defined as a portion of the crankshaft (not shown) or a component operably coupled to the crankshaft such that rotational movement of the crankshaft is provided to transmission 42 through output 56. Output 56 of engine 40 is configured to align with an input 58 of transmission 42 to operably couple together engine 40 and transmission 42. In one embodiment, input 58 of transmission 42 may be a shaft or other member configured to receive rotational movement or output from output 56 of engine 40.

Referring still to FIGS. 2A-9, transmission 42 may be configured as an automated sequential transmission ("AST") which includes a plurality of internal gears and at least one clutch (not shown) generally surrounded by an outer housing 60. In one embodiment, AST 42 also may include a reverse gear. AST 42 moves through gears in a sequential order but it is not necessary to engage intermediate gears before engaging the desired gear. For example, if the operator wishes to move from third gear to fifth gear, AST 42 will move through gears 3, 4, and 5 but it is not necessary for the operator to engage fourth gear before engaging fifth gear. In this way, a control system may open the clutch to allow rotation of the shift drum and move the dog rings from engaging third gear to fourth gear. With additional rotation of the shift drum, the dog rings move again from fourth gear to fifth gear. The clutch is then closed and torque is transmitted through fifth gear. In instances where a really fast shift is required, it is possible that the clutch will not be opened and, instead, the throttle opening may be changed to unload the dog rings and engage the next gear.

Because illustrative transmission 42 is configured as an AST, transmission 42 may have features of both an automatic transmission and a manual transmission. More particularly, transmission 42 may not automatically change gears, as would an automatic transmission, but does allow for a sequential manual gear change without the need to depress or otherwise actuate a clutch input (e.g., a clutch pedal, clutch lever). For example, transmission 42 may be operably coupled to sensors, actuators (e.g., an electric gear shift actuator, such as an electric motor), and/or any other device such that the clutch is clamped or engaged and gear changes may be electronically, hydraulically, pneumatically, or otherwise automated, rather than through a mechanical linkage. In one embodiment, the actuators may be electronically, hydraulically, or pneumatically-controlled to move between various gears of transmission 42 and may be controlled in response to sensor outputs rather than an operator input to a clutch member. With transmission 42 configured as an AST, vehicle 10 may be capable of various drive modes (e.g., rock-crawl mode) and may have the ability for various capabilities on certain terrain, such as holding the position of vehicle 10 when on an incline or hill in response to a throttle, clutch, and/or brake input. For example, the input may initiate a modulation of the throttle and clutch pressure to allow vehicle 10 to remain on an incline for a period of time.

To further facilitate different gear ratios or gear changes, driveline assembly 16 includes gearbox 44. Gearbox 44 also may be a shiftable mechanical range box or a transfer case and is configured to allow for a change between high and low gears and at least doubles the available gear ratios. Gearbox 44 also may include a reverse gear. In other embodiments, gearbox 44 may be controlled through any other means, such as electronics or pneumatics.

Referring to FIG. 2A, in one embodiment, gearbox 44 may be integral with AST 42 such that a gear set 43 of AST 42 and a gear set of gearbox 44 are positioned within a single housing 45. Alternatively, and referring to FIG. 2B, gearbox 44 may be separate from AST 42. Illustratively, as shown in FIG. 2B, gearbox 44 may be directly coupled to AST 42 but the gear sets thereof are each supported within separate housings.

With respect to the embodiment of FIG. 2B, and as shown best in FIG. 5, gearbox 44 is operably or drivingly coupled to transmission 42 through a connection between an output 62 of transmission 42 and an input 64 of gearbox 44. Illustratively, output 62 of transmission 42 may be an output shaft configured to provide rotational power to gearbox 44.

Referring still to FIG. 5, it may be appreciated that output 56 of engine 40 is longitudinally aligned with input 58 of transmission 42, input 58 is longitudinally aligned with output 62 of transmission 42, and output 62 is longitudinally aligned with input 64 of gearbox 44 such that outputs 56, 62 and inputs 58, 64 are all aligned along the same longitudinal axis A. In this way, engine 40 is longitudinally aligned with transmission 42 and a portion of gearbox 44.

Figure 3:
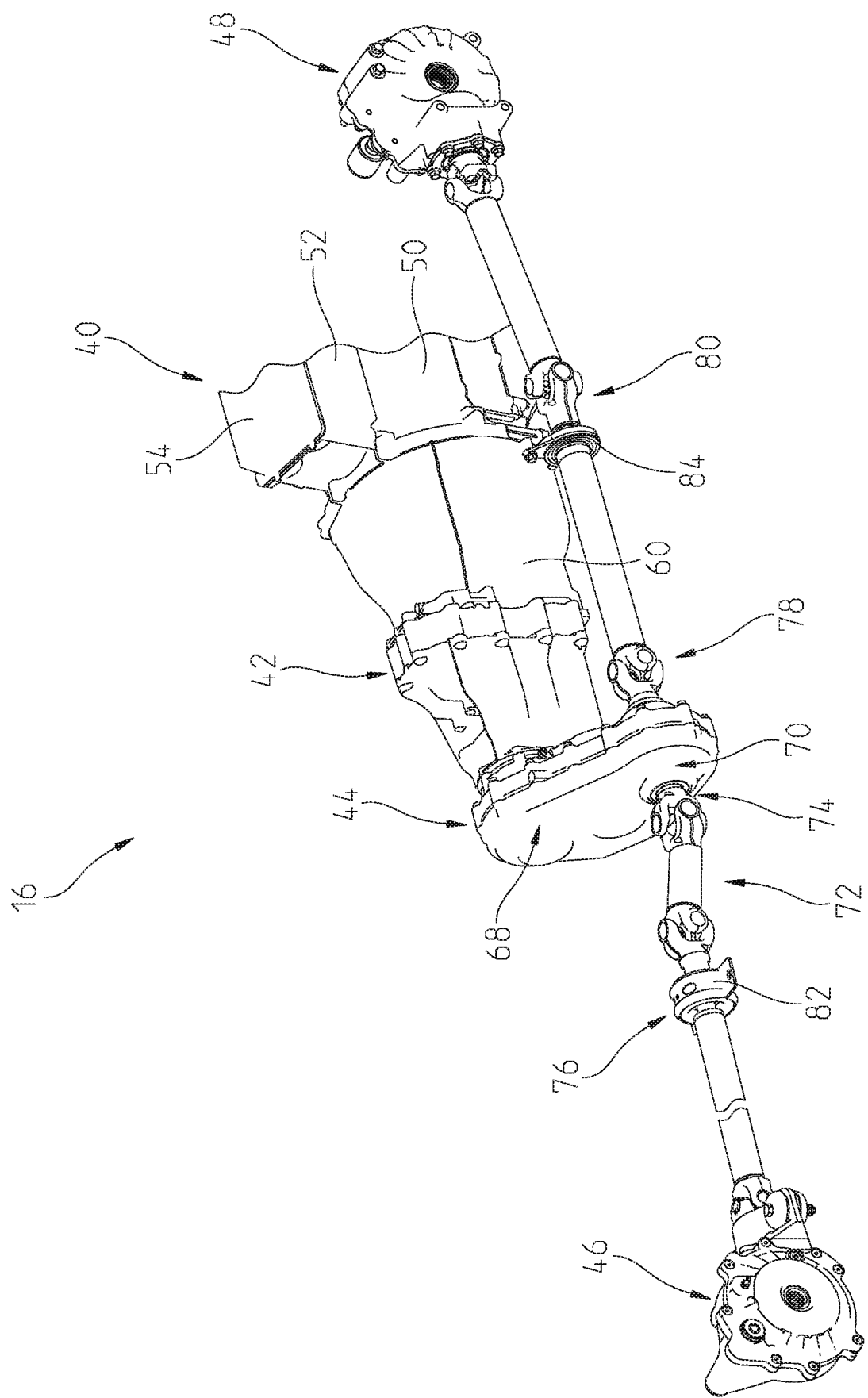
FIG. 3 is a front left perspective view of the driveline assembly of FIG. 2B.
Figure 4A:
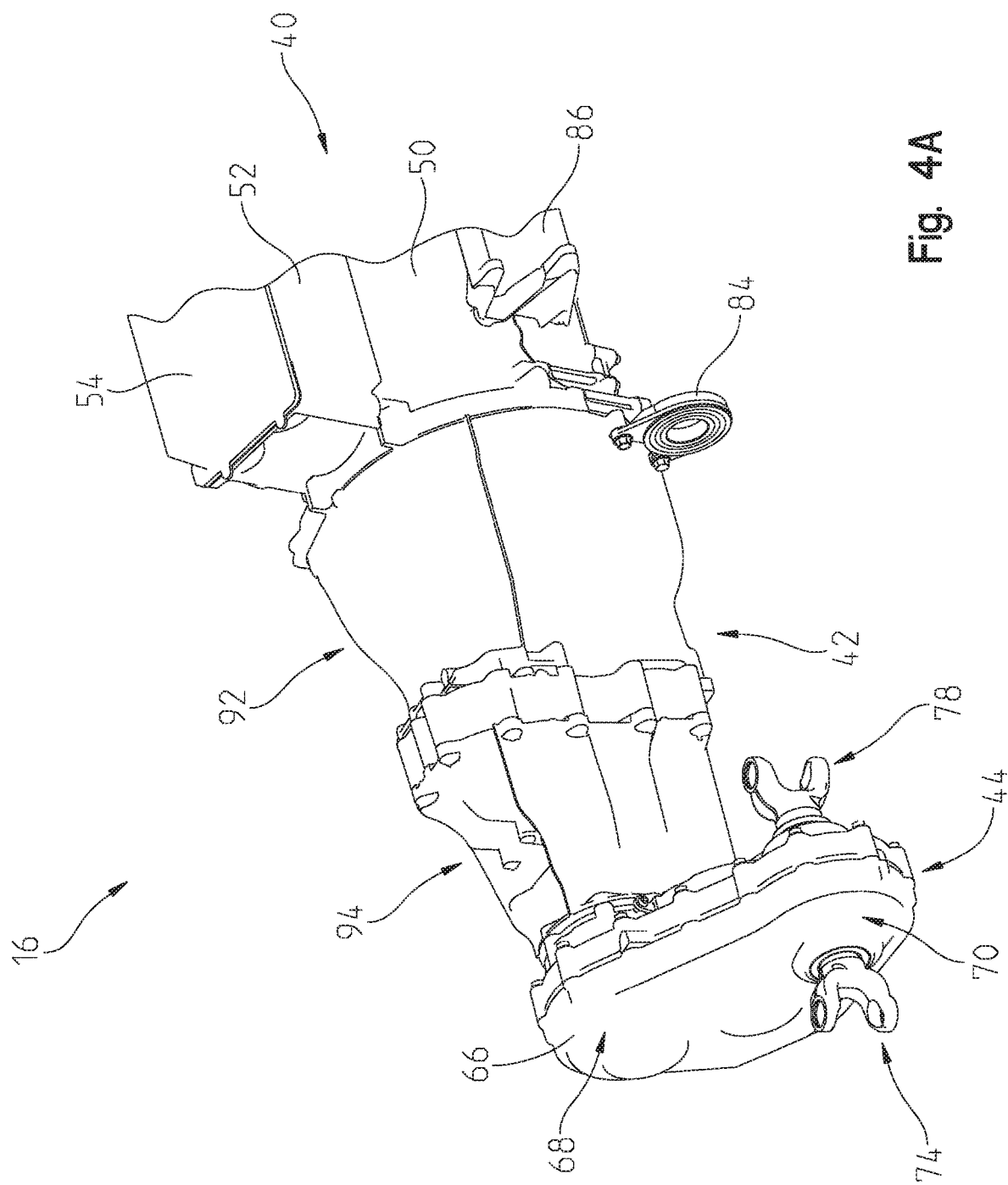
FIG. 4A is a front left perspective view of an engine, automated sequential transmission, and a gearbox of the driveline assembly of FIG. 3.
Figure 4B:
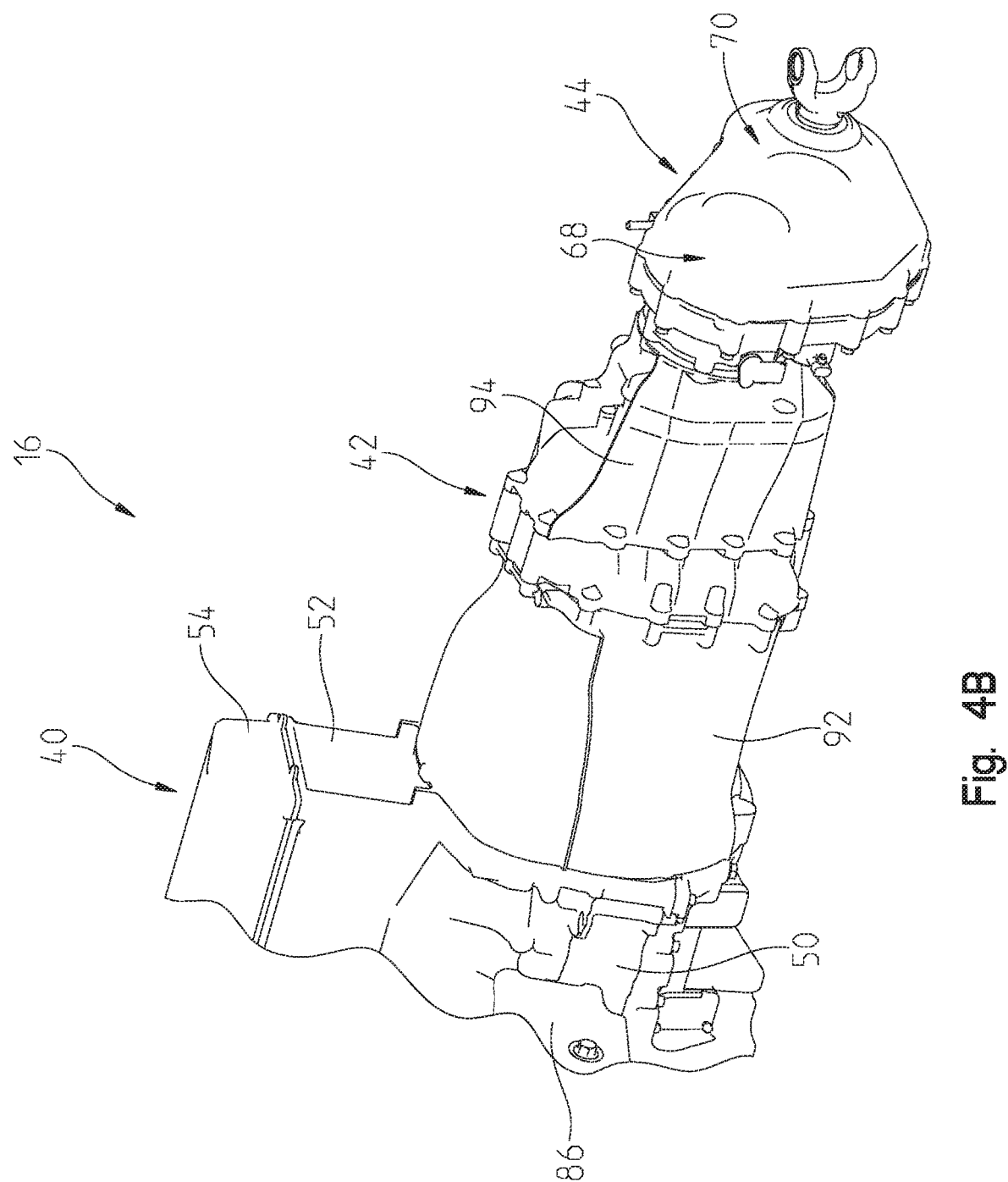
FIG. 4B is a front right perspective view of the engine, automated sequential transmission, and gearbox of the driveline assembly of FIG. 4A.

As shown in FIGS. 3-9, gearbox 44 includes an outer housing 66 defining a first portion 68, which includes input 64, and a second portion 70. Illustratively, gearbox 44 extends laterally relative to centerline L such that first portion 68 is operably coupled to transmission 42 and is positioned on a first side (i.e., the right side) of centerline L and second portion 70 is positioned on a second side (i.e., the left side) of centerline L. As shown in FIGS. 3 and 6, second portion 70 is operably coupled to a prop shaft 72 such that internal gears (not shown) of gearbox 44 transmit movement of input 64 of first portion 68 to prop shaft 72 through gears in first and/or second portions 68, 70. Prop shaft 72 may be configured as a multi-piece prop shaft. More particularly, second portion 70 of gearbox 44 includes a first or forward output 74 operably coupled to a front prop shaft 76. Second portion 70 of gearbox 44 also includes a second or rearward output 78 operably coupled to a rear prop shaft 80. First and second outputs 74, 78 each may be defined as a joint, such as a portion of a U-joint.

As shown in FIGS. 3 and 6, front prop shaft 76 extends between gearbox 44 and front final drive member 46 and is operably coupled thereto to provide power to front final drive member 46 for driving front ground-engaging members 12. In this way, front prop shaft 76 extends forwardly from gearbox 44. Front prop shaft 76 may be supported on a portion of front frame portion 20a (FIG. 6) through a carrier bearing 82. Additionally, at least a portion of front prop shaft 76 may be angled relative to centerline L, as shown in FIG. 6. In one embodiment, front prop shaft 76 may be defined as a single shaft or may include a plurality of shafts operably coupled together.

Referring still to FIGS. 3 and 6, rear prop shaft 80 extends between gearbox 44 and rear final drive member 48 and is operably coupled thereto to provide power to rear final drive member 48 for driving rear ground-engaging members 14 with rear axles or half shafts 100. Rear final drive member 48 may be generally positioned along centerline L such that rear axles 100 have the same approximate lateral length between rear final drive member 48 and rear ground-engaging members 14.

Rear prop 80 may extend along a portion of rear frame portion 20b (FIG. 6) and may be supported by a carrier bearing 84 coupled to housing 60 of transmission 42. In this way, rear prop shaft 80 may not be coupled to frame assembly 20, but rather, may be coupled to transmission 42. Illustratively, rear prop shaft 80 extends rearwardly from gearbox 44 and is positioned laterally adjacent engine 40 and transmission 42. Rear prop shaft 80 may be configured to extend in a direction parallel to centerline L and may be positioned on the second side of centerline L, as shown in FIG. 6. In one embodiment, rear prop shaft 80 may be defined as a single shaft or may include a plurality of shafts operably coupled together.

Because vehicle 10 is configured for off-road applications, the width and wheel base of vehicle 10 may be reduced for trail compatibility. For example, the width of vehicle 10 may be approximately 50-65 inches and the wheel base of vehicle 10 may be approximately 70-110 inches. This compact size of vehicle 10 may necessitate the need for a particular arrangement or configuration of driveline assembly 16 on vehicle 10.

Figure 7:
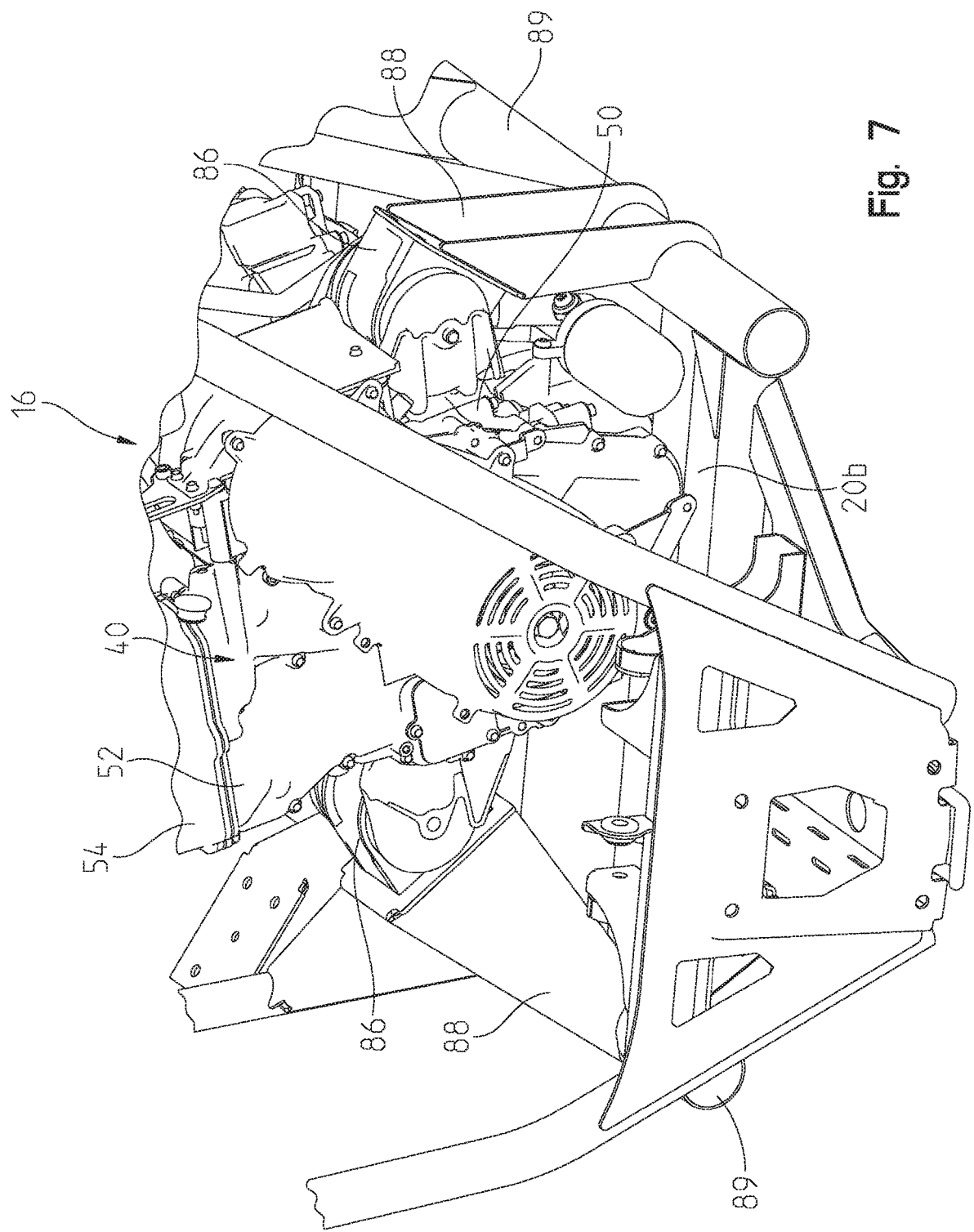
FIG. 7 is a rear right perspective view of a rear portion of the engine of FIG. 4A supported on the frame assembly of FIG. 6.
Figure 8:
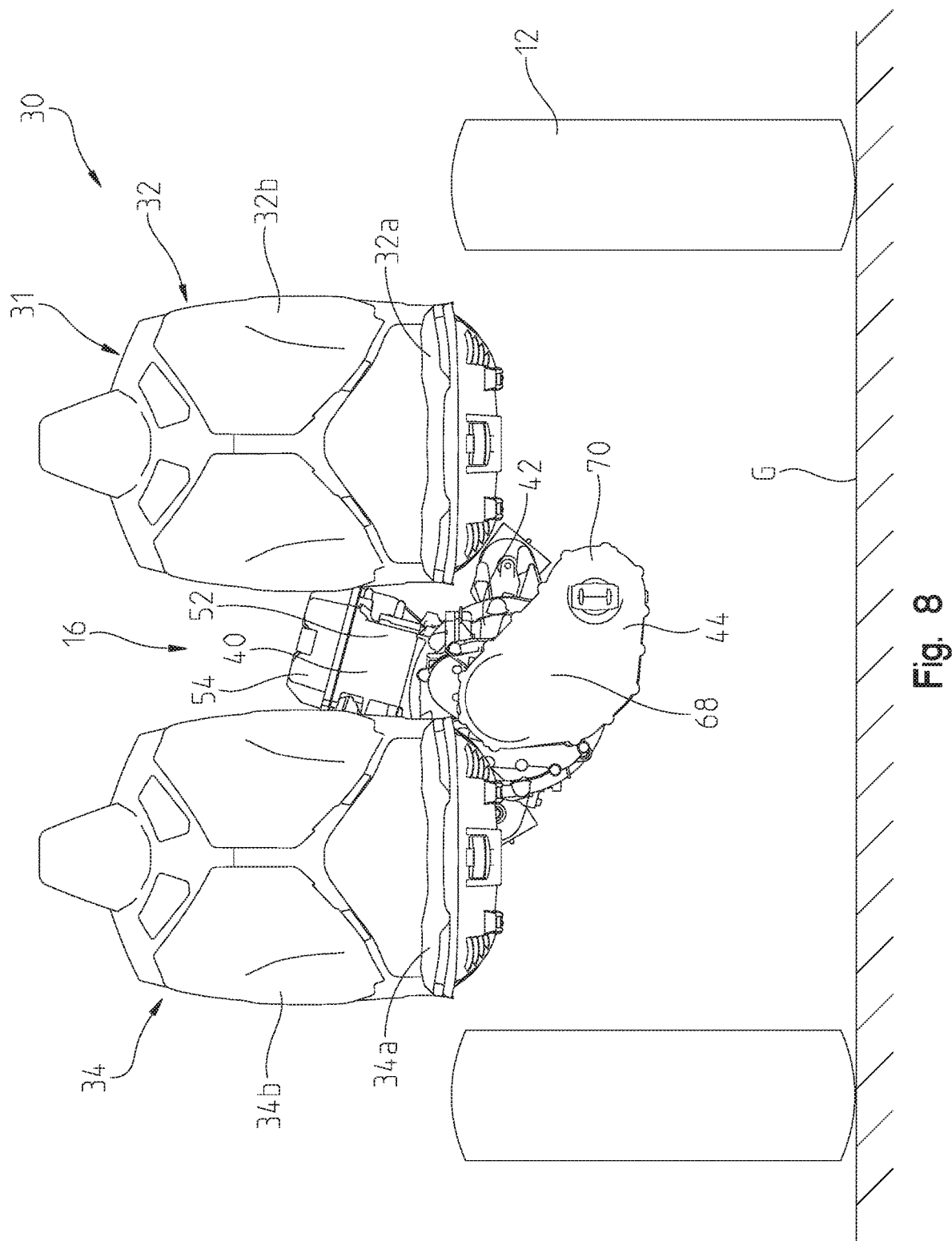
FIG. 8 is a front view of the engine, automated sequential transmission, and gearbox of the driveline assembly of FIG. 4A positioned relative to seating for the utility vehicle of FIG. 1.
Figure 9:
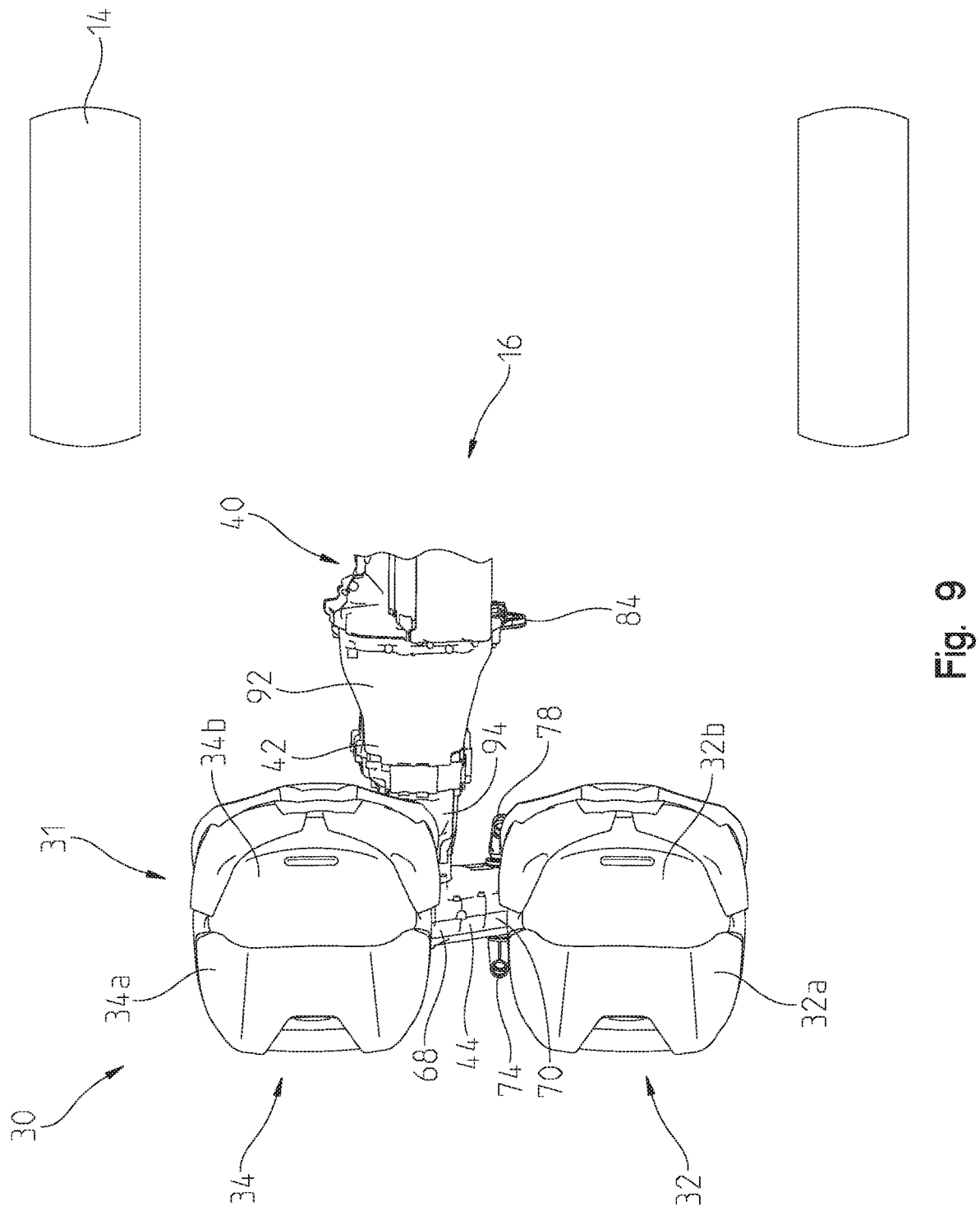
FIG. 9 is a top view of the engine, automated sequential transmission, and gearbox of the driveline assembly of FIG. 4A positioned relative to the seating of FIG. 8.

Illustratively, and referring to FIGS. 6-8, at least a portion of driveline assembly 16 is supported on rear frame portion 20b of frame assembly 20. More particularly, engine 40 is positioned entirely rearward of a rearward-most extent of operator area 30 such that the forward-most extent of engine 40 is rearward of rearward-most extent 33b, 35b of at least seats 32, 34. Additionally, engine 40 may be generally positioned to the first side (i.e., the right side) of centerline L such that the majority of engine 40 is positioned rearward of front passenger seat 34. However, as shown in FIG. 9, because cylinders 52 may be angled relative to vertical, at least a portion of cylinders 52 and cylinder heads 54 may be positioned laterally intermediate seats 32, 34. While cylinders 52 are at a longitudinal position rearward of the longitudinal position of seats 32, 34, the lateral position of cylinders 52 may be positioned along centerline L such that cylinders 52 are exposed between seats 32, 34 in the front view of FIG. 8.

Engine 40 also is positioned within an envelope defined by rear suspension assembly 26. More particularly, the longitudinal envelope of rear suspension assembly 26 may be defined by the forward-most extent of trailing arms 36 and the rearward-most extent of radius rods 38. Illustratively, the forward and aft extents of trailing arms 36 and the lateral width between trailing arms 36 together define a longitudinal envelope 90 thereof, and engine 40 is positioned entirely within longitudinal envelope 90 of trailing arms 36. In this way, engine 40 is positioned laterally intermediate trailing arms 36 and is positioned longitudinally within the longitudinal extent of trailing arms 36. As such, engine 40 is positioned outside of operator area 30 and does not interfere with components therein. Additionally, the front end portion of vehicle 10 may be made compact because engine 40 is not supported therein either.

As disclosed herein, transmission 42 is positioned longitudinally forward of engine 40 and, illustratively, is directly coupled to crankcase 50 with mechanical fasteners. In this way, transmission 42 is not spaced apart from engine 40 or laterally offset from engine 40 but, instead, is longitudinally aligned with engine 40. Transmission 42 is positioned rearward of a portion of operator area 30 such that a rear portion 92 of transmission 42 is rearward of rearward-most extent 33b, 35b of at least seats 32, 34 and a forward portion 94 of transmission 42 extends into operator area 30. More particularly, rear portion 92 is positioned entirely rearward of rearward-most extent 33b, 35b of seating 31 and forward portion 94 may be positioned vertically under or below a portion of seat bottom 34a. In one embodiment, forward portion 94 of transmission 42 is positioned rearward of forward-most extent 35a of seat bottom 34a but is forward of rearward-most extent 35b of seat bottom 34a. Additionally, transmission 42 may be generally positioned to the first side (i.e., the right side) of centerline L such that at least the majority of transmission 42 is positioned rearward of front passenger seat 34.

Transmission 42 also is positioned partially within longitudinal envelope 90 of trailing arms 36. More particularly, as shown in FIG. 6, rear portion 92 of transmission 42 is positioned entirely within envelope 90 and forward portion 94 of transmission 42 is positioned partially within envelope 90. In this way, transmission 42 is at least partially positioned laterally intermediate trailing arms 36 and is partially positioned longitudinally within the longitudinal extent of trailing arms 36. As such, at least a portion of transmission 42 is positioned outside of operator area 30 and does not interfere with components therein. Additionally, the front end portion of vehicle 10 may be made compact because transmission 42 is not supported therein either.

Referring still to FIGS. 6-9, gearbox 44 is positioned longitudinally forward of transmission 42 and, illustratively, may be directly coupled to outer housing 60 of transmission 42 with mechanical fasteners. In this way, gearbox 44 is not spaced apart from transmission 42 is in a directly coupled relationship therewith. Additionally, at least first portion 68 of gearbox 44 is directly longitudinally aligned with transmission 42.

In order to accommodate gearbox 44 on vehicle 10, illustrative gearbox 44 is positioned within operator area 30 and, more particularly, is positioned vertically below or under a portion of seating 31 such that gearbox 44 and seating 31 are at least partially vertically overlapping. As shown in FIGS. 6, 8, and 9, first portion 68 of gearbox 44 may be positioned vertically below a portion of seat bottom 34a and second portion 70 of gearbox 44 may be positioned vertically below a portion of seat bottom 32a. In this way, and because first and second portions 68, 70 of gearbox 44 are integral with each other, gearbox 44 extends laterally across centerline L and between seats 32, 34 such that first portion 68 is positioned on the first side (i.e., the right side) of centerline L and second portion 70 is positioned on the second side (i.e., the left side) of centerline L. In one embodiment, gearbox 44 is positioned rearward of forward-most extent 33a, 35a of seat bottoms 32a, 34a but is forward of rearward-most extent 33b, 35b of seat bottoms 32a, 34a. Gearbox 44 also is positioned forward of envelope 90 of trailing arms 36.

Because second portion 70 of gearbox 44 is positioned on the second side of centerline L, rear prop shaft 80 also is positioned on the second side of centerline L. In this way, rear prop shaft 80 is laterally adjacent transmission 42 and engine 40 and is positioned on the opposite side of centerline L relative to a majority of at least engine 40 and transmission 42. Illustratively, rear prop shaft 80 may be parallel to centerline L. As shown in at least FIG. 6, engine 40 and transmission 42 are positioned laterally intermediate rear prop shaft 80 and trailing arm 36 on the right side of vehicle 10.

Additionally, because second portion 70 of gearbox 44 is positioned on the second side of centerline L, at least output 74 and a portion of front prop shaft 76 also are positioned on the second side of centerline L. Illustratively, as shown in FIG. 6, front prop shaft 76 may be angled relative to centerline L such that a rearward portion of front prop shaft 76 is positioned on the second side of centerline L but a forward portion of front prop shaft 76 may intersect centerline L to couple with front final drive member 46. Front final drive member 46 may be generally aligned with centerline L.

As disclosed herein, driveline assembly 16 is configured to extend from the front to the rear of vehicle 10 and components thereof are positioned on both the first and second sides of centerline L. As such, the configuration of driveline assembly 16, which includes engine supported on rear frame portion 20b, transmission 42 positioned forward of engine 40, rather to the side of engine 40, and gearbox 44 positioned forward of transmission 42, is accommodated on vehicle 10 without increasing the width or wheel base of vehicle 10. Additionally, the configuration of driveline assembly 16 allows for both front and rear ground-engaging members 12, 14 to be driven by engine 40.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A driveline assembly for a utility vehicle, comprising:
an engine;
an automated sequential transmission positioned forward of the engine;
a gearbox operably coupled to the automated sequential transmission;
a prop shaft extending rearwardly from the gearbox, wherein the prop shaft is operably coupled to a rear drive member, and at least a portion of the prop shaft is positioned laterally adjacent the engine and the automated sequential transmission; and
the prop shaft is supported on the automated sequential transmission.

2. The driveline assembly of claim 1, further comprising a prop shaft extending forwardly from the gearbox and operably coupled to a front drive member, and the front drive member being positioned along a longitudinal centerline of the utility vehicle and the prop shaft being angled relative to the longitudinal centerline.

3. The driveline assembly of claim 1, further comprising a first prop shaft extending forwardly from the gearbox and a second prop shaft extending rearwardly from gearbox, and at least a portion of the first prop shaft and at least a portion of the second prop shaft is laterally spaced apart from a longitudinal centerline of the utility vehicle.

4. The driveline assembly of claim 3, wherein the gearbox includes a first portion positioned on a first side of the longitudinal centerline and operably coupled to the automated sequential transmission and includes a second portion positioned on a second side of the longitudinal centerline and operably coupled to the first and second prop shafts.

5. The driveline assembly of claim 1, wherein the engine includes an outer housing and the automated sequential transmission is directly coupled to the outer housing of the engine.

6. The driveline assembly of claim 1, wherein the gearbox is positioned forward of the automated sequential transmission.

7. The driveline assembly of claim 1, wherein the engine includes an output operably coupled to an input of the automated sequential transmission, the automated sequential transmission includes an output operably coupled to an input of the gearbox, and the output of the engine is longitudinally aligned with the input of the automated sequential transmission, the output of the automated sequential transmission, and the input of the gearbox.

8. The driveline assembly of claim 1, wherein the gearbox is one of directly coupled to the automated sequential transmission or integrated with the automated sequential transmission.

9. A utility vehicle, comprising:
a plurality of ground-engaging members;
a frame assembly supported by the plurality of ground-engaging members;
an operator area supported by the frame assembly and including seating having a first seating portion for an operator and a second seating portion for a passenger; and
a driveline assembly operably coupled to the plurality of ground-engaging members, the driveline assembly comprising:
an engine positioned rearward of the operator area;
an automated sequential transmission operably coupled to the engine and positioned at least partially rearward of a rearwardmost extent of at least one of the first seating portion and the second seating portion;
a gearbox operably coupled to the automated sequential transmission and positioned rearward of at least a portion of the seating; and
the engine includes a crankcase, a cylinder coupled to the crankcase, and a cylinder head coupled to the cylinder, and the cylinder and the cylinder head are positioned laterally intermediate the first and second seating portions at a first longitudinal position, and the first and second seating portions are positioned at a second longitudinal position spaced apart from the first longitudinal positions.

10. The utility vehicle of claim 9, wherein the automated sequential transmission is positioned rearward of a forward extent of the first and second seating portions.

11. The utility vehicle of claim 9, wherein the gearbox is positioned rearward of a forward extent of the first and second seating portions.

12. The utility vehicle of claim 9, wherein the gearbox is positioned under the first and second seating portions and laterally extends between the first and second seating portions.

13. The utility vehicle of claim 9, wherein a forward portion of the automated sequential transmission is positioned under a portion of the second seating portion.

14. The utility vehicle of claim 13, wherein the engine is positioned rearward of second seating portion and is laterally spaced apart from the first seating portion.

15. A utility vehicle, comprising:
at least one front ground-engaging member;
at least one rear ground-engaging member;
a frame assembly supported by the at least one front ground-engaging member and the at least one rear ground-engaging member;
an operator area supported by the frame assembly and including seating for at least an operator;
a rear suspension assembly operably coupled to the at least one rear ground-engaging member and including trailing arms operably coupled to the at least one rear ground-engaging member and the frame, a shock absorber operably coupled to each of the trailing arm, at least one radius rod operably coupled to the at least one rear ground-engaging member; and
a driveline assembly operably coupled to the at least one front ground-engaging member and the at least one rear ground-engaging member, the driveline assembly comprising:
an engine positioned rearward of the operator area and positioned within a longitudinal envelope defined by the trailing arms;
an automated sequential transmission operably coupled to the engine and positioned at least partially rearward of the operator area, and the automated sequential transmission is positioned at least partially within the longitudinal envelope defined by the trailing arms;
a gearbox operably coupled to the automated sequential transmission and vertically overlapping with at least a portion of the seating; and
the driveline assembly includes a prop shaft positioned rearward of the operator area, and the engine and the automated sequential transmission are positioned laterally intermediate the prop shaft and one of the trailing arms.

16. The utility vehicle of claim 15, wherein the gearbox is positioned forward of the longitudinal envelope defined by the trailing arms.

17. The utility vehicle of claim 16, wherein the gearbox is positioned within a portion of the operator area.

18. The utility vehicle of claim 17, wherein the gearbox is positioned under the seating.

19. The utility vehicle of claim 17, wherein the seating includes a first seating portion for the operator and a second seating portion for a passenger, and the gearbox extends laterally between the first and second seating portions.

20. The utility vehicle of claim 15, wherein the engine and the automated sequential transmission are positioned within a longitudinal envelope defined by the one of the trailing arms and the prop shaft.

21. A utility vehicle, comprising:
at least one front ground-engaging member;
at least one rear ground-engaging member;
a frame assembly supported by the at least one front ground-engaging member and the at least one rear ground-engaging member;
an operator area supported by the frame assembly and including seating for at least an operator;
a rear suspension assembly operably coupled to the at least one rear ground-engaging member and including trailing arms operably coupled to the at least one rear ground-engaging member and the frame, a first trailing arm operably coupled to the frame at a first connection point and a second trailing arm operably coupled to the frame at a second connection point, a shock absorber operably coupled to each of the trailing arm, at least one radius rod operably coupled to the at least one rear ground-engaging member; and
a driveline assembly operably coupled to the at least one front ground-engaging member and the at least one rear ground-engaging member, the driveline assembly comprising:
an engine positioned rearward of the operator area and positioned within a longitudinal envelope defined by the trailing arms;
an automated sequential transmission operably coupled to the engine and positioned at least partially rearward of the operator area, and the automated sequential transmission is positioned at least partially within the longitudinal envelope defined by the trailing arms;
a gearbox operably coupled to the automated sequential transmission and vertically overlapping with at least a portion of the seating; and
the driveline assembly includes a propshaft extending rearwardly from the operator area, a portion of the propshaft and a portion of the automated sequential transmission extending across a vertical plane extending between the first connection point and the second connection point.

* * * * *